United States Patent
Grey et al.

[15] 3,656,441
[45] Apr. 18, 1972

[54] INCINERATOR

[72] Inventors: Jerry Grey; Auram B. Zanft, both of New York, N.Y.

[73] Assignee: Morse Boulger, Inc., Corona, N.Y.

[22] Filed: Oct. 26, 1970

[21] Appl. No.: 83,713

[52] U.S. Cl. .................. 110/8 R, 55/118, 55/120, 55/126, 55/150, 110/119
[51] Int. Cl. ............................................. F23g 5/00
[58] Field of Search ............ 55/8, 13, 118, 120, 126, 127, 55/135, 150, 151, 154; 110/7, 8, 18, 119

[56] References Cited

UNITED STATES PATENTS 3,503,348 3/1970 Dvirka ................................. 110/8
3,547,055 12/1970 Zanft .................................. 110/8

*Primary Examiner*—Kenneth W. Sprague
*Attorney*—Mason, Fenwick & Lawrence

[57] ABSTRACT

An incinerator generally including a combustion chamber, a flue and an apparatus intercommunicating the combustion chamber and the flue, for removing solid and gaseous contaminants from the combustion gases emanating from the combustion chamber and discharged through the flue into the atmosphere, the apparatus comprising a first stage separator defining at least one cylindrical chamber having a tangentially disposed inlet communicating with the combustion chamber, an outlet longitudinally spaced from the inlet and means for applying a film of liquid-washing medium on the interior wall thereof, and a second stage separator defining at least one cylindrical chamber having a tangentially disposed inlet communicating with the outlet of the first mentioned chamber, an outlet longitudinally spaced from the inlet thereof and communicating with the flue, means for applying a film of liquid-washing medium on the interior wall thereof and means for producing an electrostatic field between a locus with the chamber and the interior wall thereof, of sufficient strength to produce a corona discharge for ionizing solid and gaseous contaminants contained in the gases traversing therethrough whereby the contaminants will be subjected to combined centrifugal, electrostatic and gravitational forces to cause the contaminants to be diverted into contact with the film of liquid-washing medium and be removed therewith.

20 Claims, 2 Drawing Figures

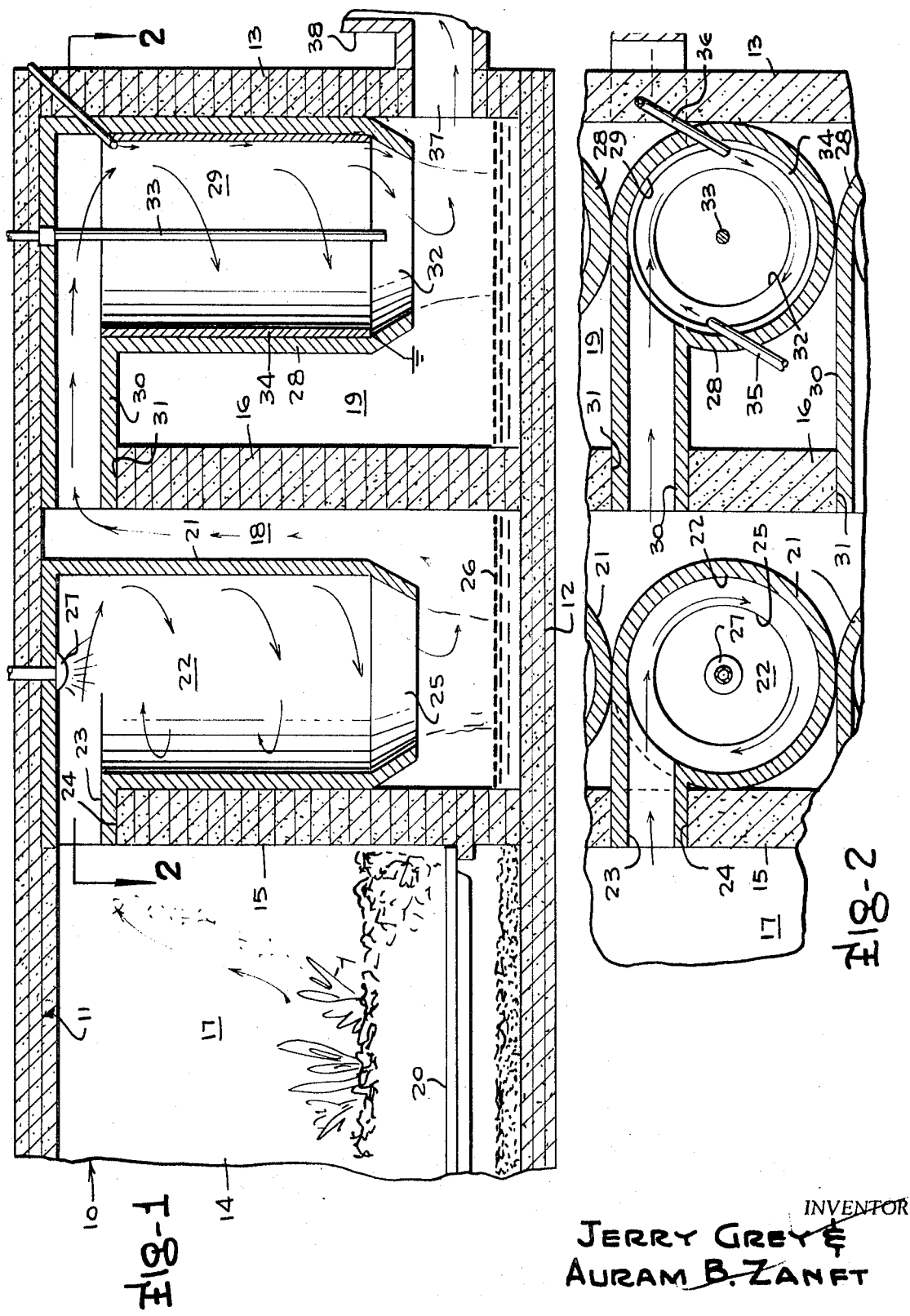

INCINERATOR

This invention relates to a novel incinerator and more particularly to an incinerator capable of producing an effluent emitted into the atmosphere, having a minimum content of solid and gaseous contaminants. This invention further contemplates a novel apparatus for removing solid and gaseous contaminants from a stream of gases, suitable for use in incinerators and other effluent emitting devices.

In the past, incineration has been found to be the most practical and economical method of solid waste disposal. In view of this, many municipal, industrial, commercial and residential types of incinerators have been designed, erected and operated over a period of many decades. With the increased use of such incinerators and other sources of effluent emission into the atmosphere, such as automotive exhaust emissions and industrial and power plant emissions, pollution of the atmosphere has approached critical levels potentially hazardous to human and animal life.

As a result of the increased pollution of the atmosphere, federal, state, county and municipal governments have enacted legislation establishing more stringent code requirements with respect to effluent emissions of municipal, industrial and residential incinerators. Many government codes require the particulate loading of effluent emissions not to exceed 0.10 to 0.20 grains per standard cubic foot. It has been found, however, that most existing incinerators and other installations emitting effluent into the atmosphere are incapable of complying with such code requirements. Furthermore, it has been found that most new incinerator designs which have been proposed perhaps may be capable of complying with such code requirements but are economically unfeasible to erect and operate.

Accordingly, it is the principal object of the present invention to provide a novel apparatus for removing solid and gaseous contaminants entrained in a stream of gas.

Another object of the present invention is to provide a novel apparatus suitable for use with a device emitting effluent into the atmosphere for removing solid and gaseous contaminants entrained in such effluent.

A further object of the present invention is to provide a novel apparatus suitable for use with a device emitting particulate laden effluent into the atmosphere, for removing such particulate so that the particulate loading of the effluent will approach the particulate loading of the ambient atmosphere.

A still further object of the present invention is to provide a novel apparatus for removing solid and gaseous contaminants entrained in a stream of gas, which is relatively simple in construction and comparatively inexpensive to operate.

Another object of the present invention is to provide a novel incinerator.

A further object of the present invention is to provide a novel incinerator operable to produce an effluent emission having a low particulate loading.

A still further object of the present invention is to provide a novel incinerator including means for removing solid and gaseous contaminants entrained in the gaseous products of combustion.

Another object of the present invention is to provide a novel incinerator capable of producing an effluent emission having a particulate loading approaching the particulate loading of the ambient atmosphere.

Another object of the present invention is to provide a novel incinerator capable of meeting governmental code requirements pertaining to the pollution of the atmosphere.

A further object of the present invention is to provide a novel incinerator capable of producing an effluent emission having a particulate loading approaching the particulate loading of the ambient atmosphere, and a reduced concentration of gaseous contaminants, which is simple in construction and comparatively inexpensive to erect, operate and service.

Other objects and advantages of the present invention will become more apparent to those persons having ordinary skill in the art to which the invention pertains, from the following description taken in conjunction with the accompanying drawing wherein FIG. 1 is a vertical cross-sectional view of an embodiment of the invention, having portions thereof broken away; and FIG. 2 is a cross-sectional view taken along line 2—2 in FIG. 1.

Broadly described, the present invention relates to an incinerator including a combustion chamber, a flue, and an apparatus for removing solid and gaseous contaminants from combustion gases emanating from the combustion chamber and discharged through the flue into the atmosphere, the apparatus generally comprising separator means including at least one vertically disposed, cylindrical chamber having an inlet for tangentially admitting gases to be treated, means for injecting a liquid-washing medium into the chamber to provide a swirling film of liquid-washing medium flowing downwardly in the chamber along the interior wall thereof, an outlet longitudinally spaced from the inlet of the chamber and communicating with the flue, and means for producing an electrostatic field between at least one point within the interior of the chamber and the interior wall thereof, of sufficient strength to produce at least one corona discharge for ionizing solid and gaseous contaminants entrained in gases traversing through the chamber, and means intercommunicating the combustion chamber and the inlet of the separator chamber for cooling the combustion gases whereby gases emanating from the combustion chamber will be cooled by the cooling means and contaminants entrained in the cooled gases introduced into the separator chamber will be subjected to combined centrifugal, electrostatic and gravitational forces to cause contaminants entrained in the gas stream to be diverted into contact with the swirling film of liquid-washing medium and be removed therewith.

In accordance with a more specific embodiment of the invention, there is provided an incinerator which includes a combustion chamber, a flue and an apparatus intercommunicating the combustion chamber and the flue, for removing solid and gaseous contaminants from the combustion gases emanating from the combustion chamber and discharged through the flue into the atmosphere, the apparatus including a first stage separator defining at least one cylindrical chamber having a tangentially disposed inlet communicating with the combustion chamber, an outlet longitudinally spaced from the inlet, and means for applying a film of liquid-washing medium on the interior wall thereof, and a second stage separator defining at least a one cylindrical chamber having a tangentially disposed inlet communicating with the outlet of the first mentioned chamber, an outlet longitudinally spaced from the inlet thereof and communicating with the flue, means for applying a film of liquid-washing medium on the interior wall thereof and means for producing an electrostatic field between a locus within the interior of the chamber and the interior wall thereof, of sufficient strength to produce a corona discharge for ionizing solid and gaseous contaminants entrained in gases traversing therethrough whereby the contaminants will be subjected to combined centrifugal, electrostatic and gravitational forces to cause the contaminants entrained in the gas stream traversing therethrough to be diverted into contact with the film of liquid-washing medium and be removed therewith.

Preferably, the chambers are vertically disposed, the means for applying the films of liquid-washing medium on the interior walls thereof are disposed at the upper ends of the chambers, the means for applying the liquid-washing medium to the interior walls of the chamber of the second stage separator includes means for injecting the liquid-washing medium tangentially into the chamber to provide swirling film of liquid-washing medium traversing through the chamber, the means for producing the electrostatic field in the chambers of the second stage separator comprises axially disposed, negatively charged electrode and a grounded, electrically conducting collector plate lining the interior wall of the chamber, and the liquid-washing medium includes a contaminant treating agent.

In alternate embodiments of the invention, there is included a secondary combustion chamber intercommunicating the primary combustion chamber and the inlet of the chamber of the first stage separator, a settling chamber operable to remove solid contaminants having a particulate size greater than 50 microns from the combustion gases, intercommunicating the combustion chamber and the inlet of the chamber of the first stage separator or a secondary combustion chamber intercommunicating the primary combustion chamber and the inlet of the chamber of the first stage separator, which would include a settling chamber operable to remove solids having a particulate size greater than 50 microns from the combustion gases.

Referring to the drawing, there is illustrated an embodiment of the invention. The emobdiment includes an incinerator 10 having a top wall 11, a bottom wall 12, and a front end wall (not shown), a rear end wall 13 and side walls 14,14. Disposed within the incinerator is a partition wall 15 which is spaced from the front end wall and a partition wall 16 spaced between the partition wall 15 and the rear end wall 13 to provide a combustion chamber 17, a chamber 18 and a chamber 19. The front end wall of the combustion chamber is provided with an opening through which refuse may be charged into the combustion chamber onto a grate 20 which is mounted in the lower end of the chamber, spaced from the lower wall 12. Conventional openings are provided in at least one of the side walls below the grate 20 for removing ash deposited in the bottom of the combustion chamber. Although a simple combustion chamber having a grate for supporting refuse and an opening for charging refuse onto the grate are described in connection with the embodiment illustrated in the drawing, it is to be understood that any suitable type of combustion chamber utilizing any type of charging system and grate assembly or stoker may be used within the scope of the invention.

Disposed within the chamber 18 is a first stage contaminant separator consisting of a plurality of vertical conduits 21 which are disposed in side by side relation between the side walls of the chamber 18 and which define a plurality of vertically disposed, cylindrical gas washer or scrubber chambers 22. Each of the conduits is provided with a tangentially disposed inlet duct 23 which projects through an opening 24 in the partition wall 15 to communicate the combustion chamber 17 with the upper end of the cylindrical chamber 22, and a bottom outlet 25 communicating the lower end of cylindrical chamber 22 with the chamber 18. In the embodiment of the invention illustrated in the drawing, the lower ends of the conduits 21 terminate above the water line 26 at the lower end of the chamber 18 which serves as a water basin. Alternatively, the lower ends of the conduit 21 may extend below the water line 26 and the outlets of the conduits may be provided in the lower side walls thereof.

Provided on the upper end of each of the conduits 21 is a sprinkler or spray unit 27 which functions to inject a liquid-washing medium into the chamber 22 onto the interior wall thereof so that a film of such medium will flow downwardly along the interior wall of the chamber and be discharged through the outlet 25 into the water basin. It is contemplated that the sprinkler unit 27 will be connected to a fluid supply system having appropriate valving to permit the sprinkler units to be placed in service selectively. Preferably, the fluid supply system will provide for recirculating the liquid-washing medium, providing make-up liquid and introducing contaminant treating agents into the medium as will later be described.

Similarly mounted in the chamber 19 is a second stage contaminant separator consisting of a plurality of vertical conduits 28 disposed in side by side relation between the end walls of the incinerator, defining a plurality of vertically disposed, cylindrical precipitating chambers 29. Each of the upper ends of the conduits 28 is provided with a tangentially disposed inlet duct 30 which projects through an opening 31 in the partition wall 16 to intercommunicate the upper end of the chamber 18 and the upper end of the chamber 29. The lower ends of the conduits 28 are provided with outlets 32 for communicating the lower ends of the chambers 29 with the chamber 19. As shown in FIG. 1, the lower ends of the conduits 28 terminate above bottom wall 12 of the incinerator.

Axially disposed in each of the cylindrical chambers 29 is a negatively charged electrode 33 extending almost the entire length of the chamber, which cooperates with a grounded, electrically conducting collector 34 lining the interior wall of the chamber, when a high direct current voltage in the order of 4 to 10 kv is applied to the electrode 33, to produce an electrostatic field in the chamber 29 between the electrode 33 and the grounded collector 34. Contaminant diverted into contact with the grounded collector 34 is removed therefrom by a swirling film of liquid-washing medium injected onto the collector 34 by means of a pair of nozzles 35 and 36 which are connected to a fluid supply system and are positioned in the upper end of the chamber to inject the medium tangentially into the chamber 29. The fluid supply system for the nozzle 35 and 36 may be provided with appropriate valving to selectively supply the liquid-washing medium to the chambers 29, means for providing make-up liquid, means for recirculating the liquid, and possibly means for treating contaminant introduced into the washing medium as will later be described. It further is contemplated that a single fluid supply system can be utilized to supply a liquid-washing medium to the sprinkler units 27 and the nozzles 35 and 36.

In the operation of the embodiment as described, combustion gases produced by the incineration of refuse deposited on the grate 20, will be caused to rise in the combustion chamber and be introduced through the inlet ducts 23 into the upper ends of the chambers 22. As such gases enter the upper ends of the chambers 22 tangentially, they will be caused to flow downwardly in such chambers with a swirling motion and be discharged through the lower outlets 25 of the chambers. As the gases swirl downwardly in the chambers 22, the centrifugal forces created by the motion of the gases will cause a certain amount of solid contaminants in the gas stream to engage and be entrapped by the films of liquid-washing medium swirling downwardly along the interior walls of the chambers 22. Simultaneously, certain molecules of gaseous contaminants will be combined with the liquid-washing medium and carried with the medium along with the entrapped solid contaminants into the water basin at the lower end of the chamber 18. Contact of the combustion gases with the film of liquid-washing medium also functions to cool the gases from a temperature in the order of 1,500° F. to 1,700° F. to a temperature in the order of 400° F. to 600° F. Cooled gas laden with solid contaminants having a particle size substantially in the order of 5 microns and smaller, and a reduced concentration of gaseous contaminants will flow around the lower ends of the conduits 21 and upwardly in the chamber 18, to be admitted tangentially through the inlet ducts 30 into the upper ends of the chamber 29. The 180° turn made by the gases discharged through the lower ends of the conduits 21 causes a certain amount of contaminant to engage the liquid in the lower basin, and become entrapped therein.

When a sufficient voltage is applied to the electrodes 33, electrostatic fields of sufficient strength are produced in the chambers 29 between the electrodes 33 and the grounded collectors 34 to produce corona discharges therebetween. Such corona discharges function to ionize residual solid and gaseous contaminants entrained in the gas streams introduced into the upper ends of the chambers 29 and caused to move downwardly therein with a swirling motion. As the streams of gases laden with residual solid and gaseous contaminants traverse downwardly through the chambers 29 with a swirling motion, the residual solid and gaseous contaminants in the streams of gases will be subjected to a combination of centrifugal, electrostatic and gravitational forces which cause the contaminants to be diverted into contact with the films of swirling liquid-washing medium flowing downwardly along the grounded collectors 34. Contact of solid contaminants with the films of liquid-washing medium will cause such contaminants to be entrapped therein. Simultaneously, the contact of gaseous contaminants with the liquid-washing medium will cause such contaminants to be combined physically or chemically with the liquid-washing medium. The entrapped solid contaminants and the combined gaseous contaminants will be discharged with the liquid-washing medium through the lower ends of the conduits 28 into the basin provided in the lower end of the chamber 19, from which the contaminant laden liquid-washing medium may be removed.

It is contemplated that certain contaminant treating agents be introduced into the liquid-washing medium injected into the chambers 29, which will adsorb or chemically react with the contaminants diverted toward the collectors 34 to render the contaminants harmless and, preferably, produce a form of the contaminants which would facilitate their removal from the liquid-washing medium. In addition, it is contemplated that any suitable liquid-washing medium such as water, with or without a contaminant treating agent, may be used to wash the cylindrical collector plates of precipitated contaminant. Alternatively, the contaminant treating agent may be introduced into the liquid-washing medium prior or subsequent to the washing of the collector plates, depending upon the nature of the contaminant.

Since many of the gaseous contaminants would consist of sulphur oxides, nitrogen oxides, and combined and uncombined halogens including fluorines, chlorines, etc., which would react with water used as a washing medium to form acids, it is contemplated that a contaminant treating agent capable of neutralizing any such acids be introduced into the water, thereby preventing the corrosion or deterioration of any of the components of the incinerator. Under such circumstances, an alkaline solution including an alkali metal hydroxide such as sodium hydroxide or potassium hydroxide, or an alkaline earth metal hydroxide such as calcium hydroxide or magnesium hydroxide, in solutions ranging from 0.05 percent to 50 percent by weight, would be added to the water utilized as a liquid-washing medium to neutralize the acids formed by such contaminants.

It is to be understood that the invention contemplates the use of any suitable liquid-washing medium either alone or in physical or chemical combination with a contaminant treating agent introduced into the liquid-washing medium either prior or subsequent to the washing operation, which in any manner, either physically or chemically, will react with the precipitated molecules of gaseous contaminants and possibly even with the precipitated solid contaminants, to render the discharge fluid from the collector plates 34 harmless, thus enhancing the contaminant removal and protecting the various components of the incinerator and auxiliary equipment from any corrosive or deteriorative effects of the combined or uncombined contaminants. It also is contemplated that contaminant treating agents may be added to the liquid-washing medium introduced into the chambers 22.

The streams of clean gases discharged through the lower end of the conduits 28, recombine and flow through an outlet opening 37 which communicates with a stack or flue 38 for emitting the clean gases into the atmosphere. It will be noted that the cooling and contaminant removal operation in the chambers 22 functions to materially reduce the temperature and contaminant loading of the combustion gases prior to introducing such gases into the chambers 29 thus enhancing the effectiveness of the contaminant removal in the chambers 29. It is contemplated that the first stage operation formed in the chambers 22 will reduce the temperature of the gases to a temperature in the order of 400° F. to 600° F., will remove solid contaminants having a particle size greater than 5 microns, and will reduce the concentration of gaseous contaminants. The gases discharged from the chambers 29 will have a solid contaminant loading approaching the loading of the ambient atmosphere, and a greatly reduced concentration of gaseous contaminants.

To further enhance the effectiveness of the incinerator as described, a secondary combustion chamber intercommunicating the combustion chamber 17 and inlet conduits 23 may be provided, which chamber would function to prolong the residence time of the burning refuse thus reducing the loading and size of solid contaminants introduced into the chambers 22. In addition, the effectiveness of the incinerator can be improved by utilizing a secondary combustion chamber having a settling chamber, inter-communicating the combustion chamber 17 and the inlets of conduits 23, as illustrated in U.S. Pat. No. 3,448,704 which issued on June 10, 1969. The use of a secondary combustion chamber having a settling chamber, would provide a three-stage solid contaminant removal operation whereby solid contaminants having a particle size greater than 50 microns substantially would be removed in the secondary combustion chamber, solid contaminants having a particle size in the order of 5 microns and greater substantially would be removed in the chambers 22 and residual solid contaminants substantially would be removed in the chambers 29, while the chambers 22 and 23 would cooperate to materially reduce the concentration of gaseous contaminants.

In the reduction of solid waste by incineration, ideally it has been sought to provide an incinerator design which is effective in reducing solid waste to a minimum volume with minimum power consumption and without unduly impairing the structural integrity of the incinerator, and emitting an effluent into the atmosphere having a solid and gaseous contaminant loading of the ambient atmosphere. It is contemplated that the aforementioned invention is operable to both economically reduce refuse to a minimum volume, and produce an effluent emission of a sufficient quality to minimize both solid and gaseous contamination of the atmosphere.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the dependent claims.

I CLAIM:

1. An incinerator comprising a combustion chamber, a flue and an apparatus intercommunicating said combustion chamber and said flue, for removing solid and gaseous contaminants from the combustion gases emanating from said combustion chamber and discharged through said flue into the atmosphere, said apparatus comprising a first stage separator defining at least one cylindrical chamber having a tangentially disposed inlet communicating with said combustion chamber, an outlet longitudinally spaced from said inlet and means for applying a film of liquid-washing medium on the interior wall thereof, and a second stage separator defining at least one cylindrical chamber having a tangentially disposed inlet communicating with the outlet of the chamber of said first stage separator, an outlet longitudinally spaced from said inlet and communicating with said flue, means for applying a film of liquid-washing medium on the interior wall thereof and means for producing an electrostatic field between at least one locus within the chamber and the interior wall thereof, of sufficient strength to produce at least one corona discharge for ionizing solid and gaseous contaminants entrained in gases traversing therethrough, whereby said contaminants will be subjected to combined centrifugal, electrostatic and gravitational forces to cause said contaminants to be diverted into contact with said film of liquid-washing medium and be removed therewith.

2. An incinerator according to claim 1 wherein said means for producing an electrostatic field comprises an axially disposed electrode and a grounded, electrically conducting collector disposed on the interior wall of said chamber.

3. An incinerator according to claim 2 wherein said axially disposed electrode is negatively charged.

4. An incinerator according to claim 1 wherein said chambers are vertically disposed and said means for applying said film of liquid-washing medium are disposed at the upper ends thereof.

5. An incinerator according to claim 1 wherein said means for applying said liquid-washing medium to said chamber of said second stage separator includes means for injecting said liquid-washing medium tangentially into said chamber to provide a swirling film of liquid-washing medium traversing through said chamber.

6. An incinerator according to claim 1 wherein said liquid-washing medium includes a contaminant treating agent.

7. An incinerator according to claim 6 wherein said contaminant treating agent consists of an agent chemically reactive with said contaminant.

8. An incinerator according to claim 6 wherein said contaminant treating agent consists of an alkaline solution.

9. An incinerator according to claim 6 wherein said contaminant treating agent consists of an adsorbing agent.

10. An incinerator according to claim 1 wherein said chambers are vertically disposed, said means for applying said films of liquid-washing medium are disposed at the upper ends thereof, said means for applying said liquid-washing medium to the chamber of said second stage separator includes means for injecting said liquid-washing medium tangentially into said chamber to provide a swirling film of liquid-washing medium traversing through said chamber, said means for producing an electrostatic field in said chamber of said second stage separator comprise an axially disposed, negatively charged electrode and a grounded, electrically conducting collector disposed on the interior wall of said chamber, and said liquid-washing medium includes a contaminant treating agent.

11. An incinerator according to claim 10 wherein said contaminant treating agent consists of an agent chemically reactive with said contaminant.

12. An incinerator according to claim 10 wherein said contaminant treating agent consists of an alkaline solution.

13. An incinerator according to claim 10 wherein said contaminant treating agent consists of an adsorbing agent.

14. An incinerator according to claim 1 including a secondary combustion chamber intercommunicating said first mentioned combustion chamber and the inlet of said chamber of the first stage separator.

15. An incinerator according to claim 1 including a settling chamber operable to remove solids having a particle size greater than 50 microns from said combustion gases, intercommunicating said combustion chamber and the inlet of said chamber of the first stage separator.

16. An incinerator according to claim 1 including a secondary combustion chamber intercommunicating said first mentioned combustion chamber and the inlet of said chamber of the first stage separator, having a settling chamber operable to remove solids having a particle size greater than 50 microns from said combustion gases.

17. An incinerator comprising a combustion chamber, a flue and an apparatus for removing solid and gaseous contaminants from gases emanating from said combustion chamber and discharged through said flue into the atmosphere, said apparatus comprising separator means defining at least one vertically disposed, cylindrical chamber having an inlet for tangentially admitting combustion gases, an outlet longitudinally spaced from said inlet communicating with said flue, means for injecting a liquid-washing medium into said chamber to provide a swirling film of liquid-washing medium traversing through said chamber along the interior wall thereof, and means for producing an electrostatic field between at least one locus within the interior of said chamber and the interior wall thereof, of sufficient strength to produce at least one corona discharge for ionizing solid and gaseous contaminants entrained in gases traversing therethrough, and means intercommunicating said combustion chamber and the inlet of said chamber for cooling said combustion gases whereby gases emanating from said combustion chamber will be cooled by said cooling means and contaminants entrained in the cooled gases introduced into and traversing said chamber will be subjected to combined centrifugal, electrostatic and gravitational forces to cause contaminants to be diverted into contact with said swirling film of liquid-washing medium and be removed therewith.

18. An incinerator according to claim 17 wherein said means for producing an electrostatic field comprises an axially disposed electrode and a grounded, electrically conducting collector disposed on the interior wall of said chamber.

19. An incinerator according to claim 18 wherein said axially disposed electrode is negatively charged.

20. An incinerator according to claim 17 wherein said liquid-washing medium includes a contaminant treating agent.

* * * * *